United States Patent [19]

Meyers

[11] Patent Number: 4,707,595

[45] Date of Patent: Nov. 17, 1987

[54] INVISIBLE LIGHT BEAM PROJECTOR AND NIGHT VISION SYSTEM

[76] Inventor: Brad E. Meyers, 17525 NE. 67th Ct., Redmond, Wash. 98052

[21] Appl. No.: 3,253

[22] Filed: Dec. 29, 1986

Related U.S. Application Data

[63] Continuation of Ser. No. 696,444, Jan. 30, 1985, abandoned.

[51] Int. Cl.$^4$ ................................................ G01J 1/00
[52] U.S. Cl. ................................. 250/504 R; 250/333; 350/1.1
[58] Field of Search ............ 250/504 R, 504 H, 453.1, 250/333, 492.1; 315/200 A; 362/183; 350/1.1

[56] References Cited

U.S. PATENT DOCUMENTS

| | | | |
|---|---|---|---|
| 1,936,514 | 11/1933 | Lengnick | 250/27.5 |
| 1,969,852 | 8/1934 | Markosek | 250/1 |
| 3,509,344 | 4/1970 | Bouwers | 250/83.3 |
| 3,752,983 | 8/1973 | Yanez | 250/333 |
| 3,760,182 | 9/1973 | Poole | 250/492.1 |
| 3,781,560 | 12/1973 | De Burgh et al. | 250/333 |
| 3,787,693 | 1/1974 | Stone | 250/330 |
| 3,833,805 | 9/1974 | Naiman et al. | 250/199 |
| 3,989,947 | 11/1976 | Chapman | 250/338 |
| 4,040,744 | 8/1977 | Schertz et al. | 356/152 |
| 4,112,300 | 9/1978 | Hall, Jr. et al. | 250/333 |
| 4,129,780 | 12/1978 | Laughlin | 250/333 |
| 4,177,500 | 12/1979 | Nicholl et al. | 362/183 |
| 4,226,529 | 10/1980 | French | 356/5 |
| 4,290,043 | 9/1981 | Kaplan | 340/29 |
| 4,309,617 | 1/1982 | Long | 250/504 H |
| 4,315,150 | 2/1982 | Darringer et al. | 250/338 |
| 4,376,889 | 3/1983 | Swift | 250/213 |
| 4,417,814 | 11/1983 | Doliber | 356/252 |
| 4,535,392 | 8/1985 | Montgomery | 362/183 |
| 4,588,253 | 5/1986 | Brunson | 250/504 R |

Primary Examiner—Bruce C. Anderson
Attorney, Agent, or Firm—Delbert J. Barnard

[57] ABSTRACT

A relatively large diameter, sharply focused beam of invisible light is produced by a projector (10) for the purpose of lighting up a person, object, etc. to be viewed at night. The projector (10) is used in conjunction with a night vision telescope (12) which includes a light intensifier (88). The projector (10) includes a pulsating infrared LED, or a laser diode, adapted to produce a high intensity narrow beam of invisible light. This beam of invisible light is enlarged by a projection lens assembly (26) adapted to sharply focus the light into a collimated light beam of about the diameter of the projector housing (20). The light source (30) is pulsed on and off, and is on only about 10–20% of the time. When on it is illuminated by a high level current which would quickly burn out the light (30) if operated continuously. The intermittent operation of the light (30) at high current produces a nonflickering high intensity light beam. The projection lens (26) enlarges this beam and clearly focuses it, to produce a relatively large illuminating beam having a substantially large range of use.

34 Claims, 5 Drawing Figures

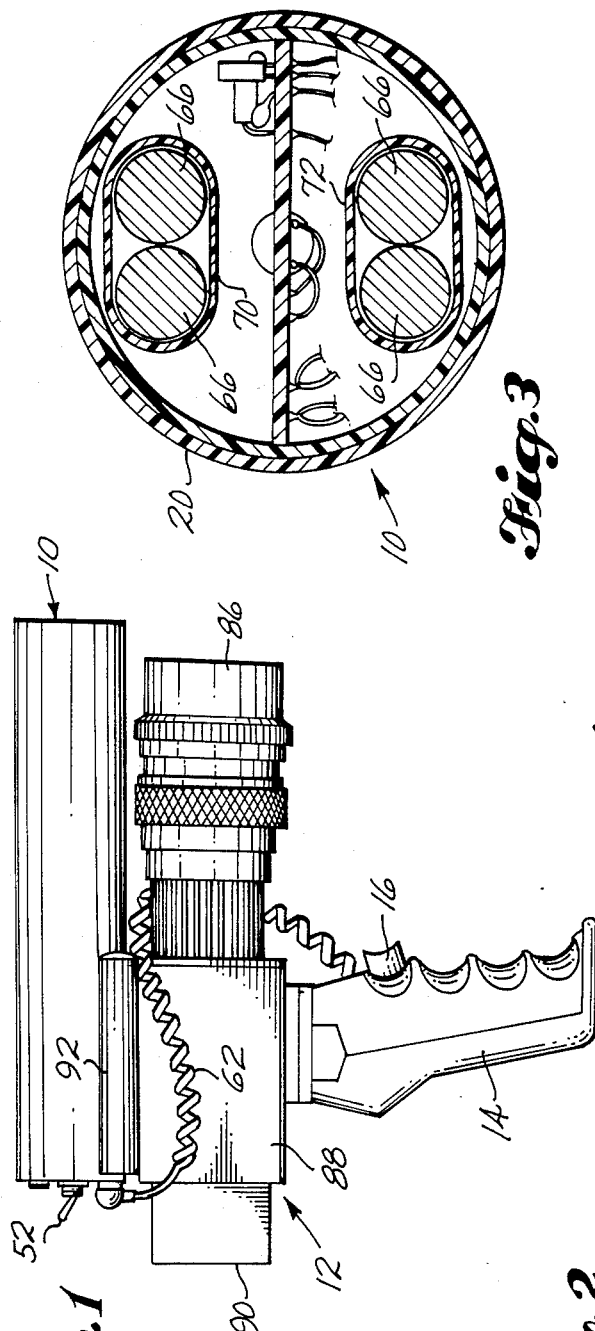
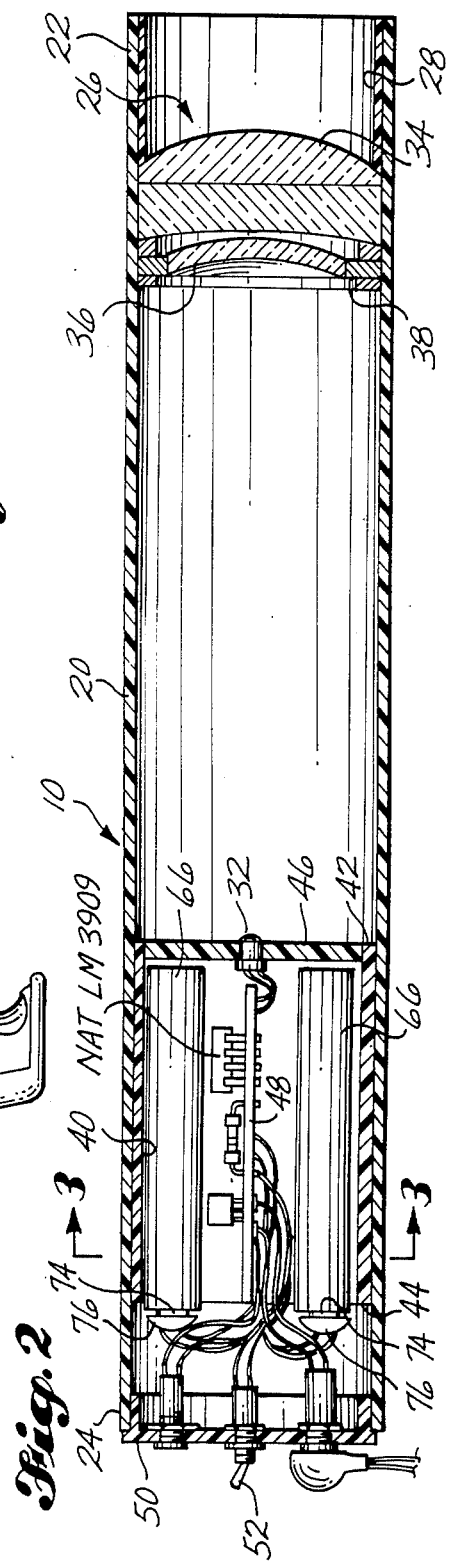

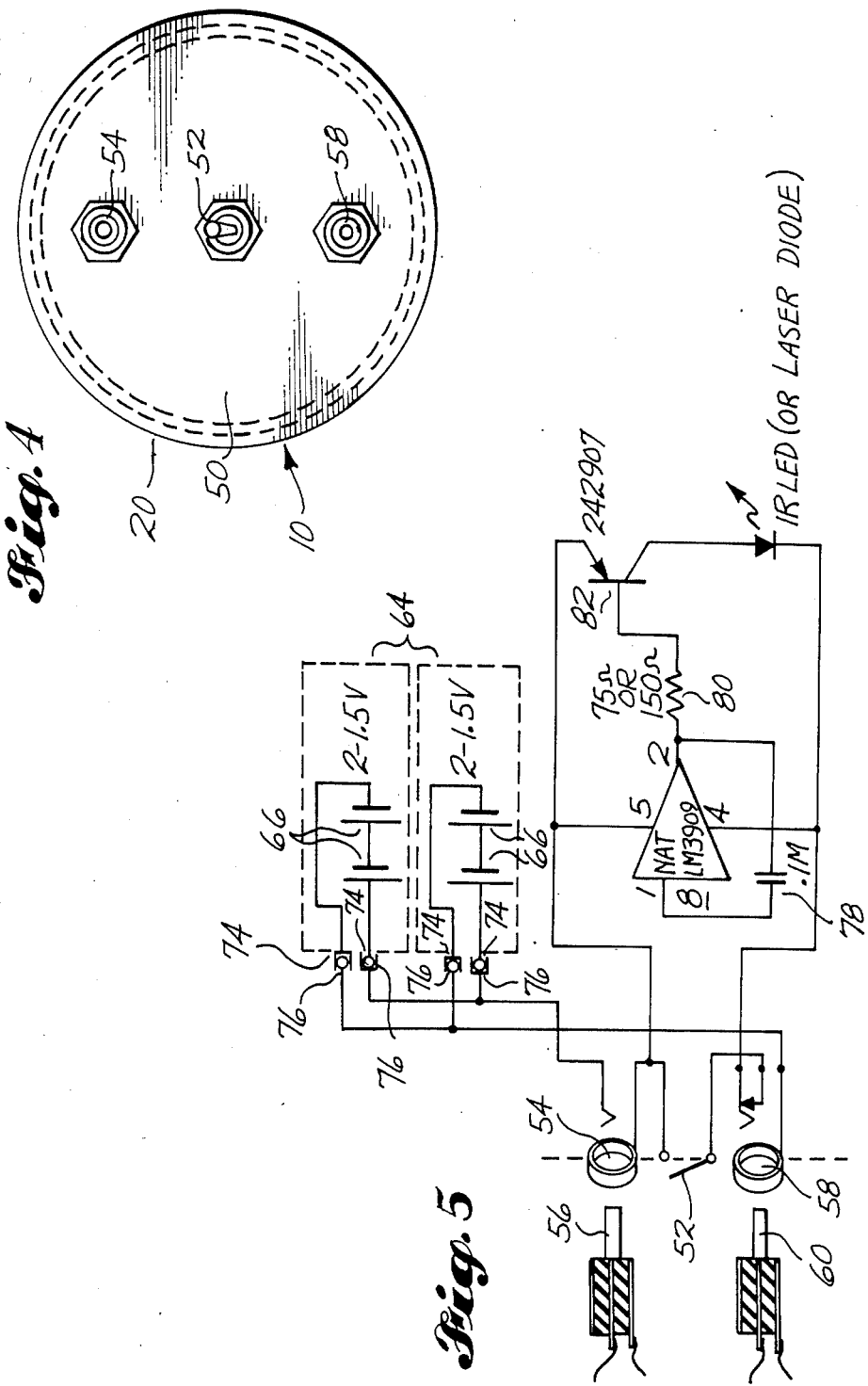

INVISIBLE LIGHT BEAM PROJECTOR AND NIGHT VISION SYSTEM

This is a continuation of application Ser. No. 696,444, filed Jan. 30, 1985, abandoned.

TECHNICAL FIELD

This invention relates to the provision of an invisible light beam projector and to a night vision system of which the projector is a part.

BACKGROUND ART

Heretofore, the term "night vision" has been associated with telescope type devices which, by use of an image intensifier, take the small amount of light which exists at night and produces from it an image which can be viewed by the eye or recorded on film.

An early form of night vision device is disclosed by U.S. Pat. No. 1,936,514, granted Nov. 21, 1933, to Thomas C. Lengnick. This patent discloses using an infrared converter with a search light. The infrared image tube converts an infrared image of an object, normally invisible to the human eye, into an image on a glass screen. This infrared converter was the predecessor of modern day image intensifiers.

A state-of-the-art image intensifier is quite well described in U.S. Pat. No. 4,417,814, granted Nov. 29, 1983, to Darrel Doliber. This patent discloses combining with an image intensifier a device for sending an aiming dot out to the object being viewed. Light produced by a light emitting diode (LED) is sharply focused through either an optical fiber or an aperture, measuring somewhere between 0.0003 to 0.010 inch in diameter. The light beam that is produced is seen by the viewer in the form of a small, bright, high color contrast, red aiming point against a yellow-green image of the viewed scene. Devices of this type, involving an aiming dot producing projector in combination with a light intensifier type night viewer, are available from a number of different sources.

U.S. Pat. No. 3,752,983, granted Aug. 14, 1973, to Serge J. Yanez discloses combining together an infrared light source, an image intensifer and a camera. The light source comprises a thirty watt electrical light bulb mounted within a reflector and an infrared filter positioned forwardly of the light bulb and reflector.

Other systems which are known at least in the patent literature, and which should be considered together with the above discussed known devices, for the purpose of putting the subject invention into proper perspective relative to the prior art, are disclosed by the following U.S. patents: U.S. Pat. Nos. 1,969,852, granted Aug. 14, 1934, to Frank J. Markosek; 3,509,344, granted Apr. 28, 1970, to Albert Bouwers; 3,781,560, granted Dec. 25, 1973, to Raymond J. DeBurgh and Harold L. Novick; 3,787,693, granted Jan. 22, 1974, to Robert L. Stone; 3,833,805, granted Sept. 3, 1974, to Charles S. Naiman, E. P. Chicklis and Arthur Linz; 3,989,947, granted Nov. 2, 1976, to Arthur S. Chapman; 4,040,744, granted Aug. 9, 1977, to Charles W. Schertz and Edward H. Ritter; 4,112,300, granted Sept. 5, 1978, to Freeman F. Hall and Jerome J. Redmann; 4,226,529, granted Oct. 7, 1980, to Herbert A. French; 4,290,043, granted Sept. 15, 1981, to Irwin M. Kaplan; 4,315,150, granted Feb. 9, 1982, to Richard F. Darringer, Wayne L. Scharf and James S. Haggerty and 4,376,889, granted Mar. 15, 1983, to David W. Swift.

There is a need for a projector that is capable of projecting, for a considerable distance, a substantial amount of light energy which is invisible to the eye, for illuminating a person or object under surveillance in the dark, for the purpose of brightening the yellow-green image seen by use of an image intensifier up to where a face can be identified and a license plate, or the like, can be read. It is also necessary that the light projector be small in size, be durable in construction, and be relatively inexpensive to manufacture. It is the principal object of the present invention to provide a night light projector which meets this criteria.

DISCLOSURE OF THE INVENTION

The term "invisible light" is used herein to mean light energy which is normally invisible to the human eye, including infrared and near infrared light.

An invisible light projector of the present invention is basically characterized by a tubular body, an invisible light beam emitting diode within the body, rearwardly of a projection lens means, and a control circuit means for the diode adapted to be repetitiously charged and discharged, and on each discharge causing the diode to light and transmit a narrow beam of invisible light to and through the projection lens means. The projection lens means is of a type which is always in focus in a range between a predetermined minimum distance from the light projector and infinity. It is positioned and adapted to receive the narrow beam of invisible light from the diode and enlarge and collimate this light into an enlarged beam of invisible light in sharp focus.

In accordance with an aspect of the invention, the control circuit means is adapted to turn the diode on and off at a rate resulting in the diode being on between about 10–20% of the time and off during the remainder of the time, and when on being powered by a current that is substantially larger than the diode could stand if on continuously.

In accordance with another aspect of the invention, the entire projector is housed within a relatively short (e.g. about ten inches) relatively small diameter (e.g. about one and seven-eights inch) tubular housing. The invisible light emitting diode is mounted at an intermediate position within the housing and the control circuit means is located within the housing between the diode and the rear end of the housing.

In accordance with yet another respect of the invention, the invisible light projector is mounted onto a tubular body of a night vision telescope which includes an image intensifier and which is itself mounted onto a pistol grip type handle having a trigger switch. The trigger switch is connected to turn on the invisible light projector whenever the switch is depressed.

The invention also involves various other details of construction and arrangements of components, as set forth in the description of the best mode, and as particularly pointed out and distinctly claimed in the claims.

BRIEF DESCRIPTION OF THE DRAWINGS

In the drawings like reference numerals are used to designate like parts throughout the several views, and:

FIG. 1 is a side elevational view of a night vision system of the present invention, showing an invisible light projector of the present invention mounted onto the body portion of a night vision telescope;

FIG. 2 is a longitudinal sectional view of the invisible light projector, with some of the detail of the control circuit means omitted;

FIG. 3 is a cross-sectional view, taken substantially along line 3—3 of FIG. 2, showing the arrangement of the circuit board and batteries within a tubular carrier within the tubular housing of the invisible light projector;

FIG. 4 is an end elevational view looking towards the rear end of the invisible light projector; and FIG. 5 is a schematic diagram of a control circuit means for the invisible light emitting diode.

BEST MODES FOR CARRYING OUT THE INVENTION

The embodiment shown in FIG. 1 comprises an invisible light projector 10 mounted adjacent to a night viewing telescope 12. The telescope 12 may be mounted onto a pistol grip type handle 14 and the invisible light projector 10 may be in turn mounted onto the housing of the telescope 12.

In the preferred embodiment, the pistol grip handle 14 includes a control trigger 16 which is connected to a control circuit for the invisible light projector, to be hereinafter be described in detail. In this embodiment, the user holds the system in one hand, by gripping the pistol grip 14, and looks into the telescope 12 through the eyepiece 18. He then squeezes the trigger 16 to turn on the light projector.

Referring to FIG. 2, the invisible light projector 10 is shown to comprise an elongated tubular body 20 having a forward end 22 and a rearward end 24. By way of typical, and therefore nonlimitive example, the tubular body 20 may measure about ten inches in length and about one and seven-eights inches in outside diameter. Tubular body 20 may be constructed from a structural plastic material or from a thin wall metal tubing, for example.

In accordance with the invention, a projection lens assembly 26 is mounted in a forward portion of the tube. The lens assembly 26 may be positioned back inside the tubular body 20 a short distance so as to provide a length of tubing 28 forwardly of the lens assembly 26 which functions as a sun shade.

Also in accordance with the invention, an invisible light emitting diode 30 is positioned rearwardly and centrally of the lens assembly 26. Diode 30 includes a forward end positioned lens 32 which is a part of the diode 30. The lens is a simple meniscus lens, or its equivalent.

Diode 30 may be an infrared LED or an infrared laser diode.

The lens assembly 26 is constructed to be capable of projecting a sharp or in focus image. The lens assembly 26 is selected to be in focus throughout a range starting with a predetermined minimum distance from the projector 10 (e.g. twenty-five feet) out to infinity.

The diode 30 emits a relatively small diameter beam of invisible light, which may be no more than about one-fourth of an inch in diameter. This beam of light is magnified and brought into sharp focus by the lens assembly 26. The lens assembly 26 sends a sharp focus beam of light out from the tubular housing 20 which, as it leaves the tubular housing 20, is substantially the diameter of the inside of the tubular housing 20 and stays in the form of a sharp focused, collimated beam throughout the full distance of its use.

It is important that the lens assembly be capable of transmitting a sharp image, so that the projected beam will not diverge an appreciable amount. In other words, the lens assembly 26 is of a type which first enlarges the small diameter beam from the diode 30 and then collimates the light into a beam of about the diameter of the tubular body 20. This results in the projected beam having a substantially long range of use.

The illustrated lens assembly 26 comprises a periscopic lens 34 positioned forwardly of a meniscus lens 36. The lens 36 is smaller in diameter than the lens 34 and is surrounded by a mounting ring 38. This arrangement results in a spot lighting affect. In other words, the light beam emitting from the tubular body 20 has relatively sharp and definite edges. If the lens 36 were to be constructed to be equal in diameter to lens 34, the beam would have the effect of an intense center beam with a fuzzy boundary.

In accordance with an aspect of the invention, the diode 30 is pulsed on and off and when on receives an amperage which would quickly burn it out the diode 30 if the amperage were to be continuous. By way of example, two amps of current can be delivered to the diode 30 at a pulse frequency of about 60-100 cycles per second, regulated so that the LED 30 is on only a small percentage of the time (e.g. 10-20%) and off the remainder of the time. This manner of operation results in it being possible to obtain a high intensity light from a relatively small diode 30 without a rapid burn out of the diode 30.

In preferred form, a tubular carrier 40 is located inside of the tubular body 20. Tubular carrier 40 has an inner end 42 and an outer end 44. An end wall 46 is provided at the inner end 42. Wall 46 includes a central opening through which the diode 30 projects, with the lens 32 of the diode 30 directed towards the projection lens assembly 26, along the center axis of the lens assembly 26. Thus, in the preferred embodiment, the wall 46 functions as a mounting means for the diode 30. Wall 24 need not close the entire end of tube 40, but rather can be in the form of a narrow strip extending across the diameter of the tube 40.

In preferred form, the control circuit means for the diode 30 includes a circuit board 48 which is of a width substantially equal to the inside diameter of carrier tube 40, so that the circuit board 48 can be slipped endwise into the tubular carrier 40 and it will extend substantially diametrically of the tube 40 and will be held in this position by virtue of its side edges contacting sidewall portions of the tube 40.

In preferred form, the rearward end 24 of the tubular body 20 is closed by a cap 50. As shown by FIG. 4, cap 46 may serve as a mount for an off/on switch 52, a receptacle 54 for an AC charger plug, 56 and a receptacle 58 for a plug 60 at the end of a cord 62 (FIG. 1) leading from the trigger switch 16. The plug is schematically shown in FIG. 5 and is designated 60 in that figure.

Referring to FIG. 5, the control circuit means for the diode 30 comprises a set of batteries 64. The battery set 64 may consist of four 1.5 volt rechargeable alkaline or nickle-cadmium batteries 66 of cylindrical form measuring about 1.9 inches in length by about 0.55 inches in diameter. In the illustrated arrangement, two of these batteries 66 are located at one side of the circuit board 48 and the other two batteries 66 are located on the opposite side of the circuit board 48. The batteries 66 may be postioned within holders 70, 72 constructed to receive two batteries per holder. The holders 70, 72 may include snap-type connectors 74 at their ends to snap connected two complimentary connectors 76 at the ends of insulated conductors which are at their opposite ends connected to conductors provided on the circuit board 48.

The off/on switch 52 is connected in series with the battery group 64 and the trigger switch 16. When off-/on switch 52 is in its on position, and the trigger switch 16 is depressed, the current from the battery group 64 is provided to an integrated circuit NAT LM 3909, in the manner illustrated by FIG. 5. The integrated circuit NAT LM 3909 charges a capacitor 60. Upon each discharge of capacitor 78, a voltage pulse is sent to a resistor 80. Resistor 80 reduces the voltage and the reduced voltage is received at the base 82 of a transistor 84. Each time that a voltage pulse is received at the base 82 of transistor 84, transistor 84 is turned on and delivers a current pulse to the diode 30. As earlier stated, the diode 30 is on somewhere between about 10% to about 20% of the time, and is off the remainder of the time. The current pulses are delivered to the diode 30 at a frequency of about 60–100 cycles per second. The frequency is established by the value of the capacitor 78. It is important that a capacitor value be chosen that will result in the appearance of a continuous light from the LED 30, and not a flickering light.

Referring back to FIG. 1, the night vision telescope 12 has an objective lens 86 at its forward end, a light intensifier 88 between its ends, and either an eyepiece 90 or a connection for a camera (not shown), etc. at its rear end.

As is known per se, the objective lens 86 is chosen to have a high light gathering power. An image of the scene in front of the objective lens 86, on which the beam of invisible light from the projector 10 has been projected, is formed on the front or image input of an input fiberoptic plate portion of the light intensifier 88. The fiberoptic plate is comprised of a bundle of thin optic fibers whose ends from the front and rear bounding surfaces of the plate. Each of the optical fibers passes one element of the image formed on the input surface to a photocathode deposited on the rear surface of the fiberoptic plate. The resulting images formed on the photocathode is therefore a mosaic of such elements. Each of the fibers is sufficiently small so as not to limit the spatial resolution of the image intensifier.

The photocathode is a photosensitive surface that emits electrons in a spatial pattern corresponding to the intensity of the optical image formed upon it by objective lens 66. A suitable photocathic material is provided by evaporating in vacuum a combination of the alkali metals potassium, sodium, antimony and cesium and depositing them on a suitable transparent substrate. This process yields a photocathode with a sensitivity from the visible into the near-infrared spectral regions.

The electrons emitted from the photocathode impinge on the input surface of a microchannel plate which multiplies them by thousands of times through the process of cascaded secondary emission. The multichannel plate consists of microscopic hollow-glass electron conducting channels fused into a disk-shaped array. The walls of these channels are specially processed to produce secondary electrons. Voltage is applied across the disk faces so that each microscopic channel represents a separate, high gain electron multiplier. The voltage is supplied by batteries housed within a housing 92 shown mounted atop the image intensifier 88. When an electron impinges upon the electron surface channel plate, secondary electrons are generated. The secondary electrons are accelerated through the channels by the applied voltage, colliding with the channel surfaces to dislodge additional secondary electrons, thereby producing electron multiplication. By varying the voltage across the disk, the gain of the multiplier can be controlled. These electrons, now increased in number and energy, impinge on a phosphor screen deposited on the front surface of a fiberoptic output plate. The phosphor is suitably a yellow-green phosphor having a spectral emission centered about 550 nanometers. As in the input fiberoptic plate, the output fiberoptic plate is also comprised of a bundle of optical fibers which relays the image to a back or output phase of the fiberoptic plate; however, the bundle is constructed with a 180 degree twist in order to invert the otherwise upside down image produced by the objective lens 86.

An image intensifier 88 of the type described is produced by the Litton Electron Tube Division of Litton Systems, Inc., of Tempe, Ariz., as Image Intensifier Tube Model L-4261. Other known types of image intensifier tubes having construction different from what is described above can be substituted for the one described and are available from a number of commercial sources.

In the illustrated embodiment, the intensified image of the field of view, formed at the output surface of the fiberoptic plate, is projected by the eyepiece lens 18 to the eye of the viewer. In another embodiment, a camera body can be connected to the rear of the telescope 12, so that the image can be recorded on film.

A viewer using a night vision system of the type disclosed by the aforementioned U.S. Pat. No. 4,417,814, would see a bright dot at the center of a dim yellow-green image. In contrast, a viewer using the night vision system of the present invention would see a bright yellow-green image, with faces, writing, and other detail clear and discernible.

It is to be understood that the embodiment shown by the drawing, and described above in reference to the drawing, is the best mode at this time, but yet is merely an example of the form that the invention may take. The scope of protection is to be determined by the following claims interpreted in accordance with the rules of patent claim interpretation, including the doctrine of equivalents.

What is claimed is:

1. An invisible light beam projector, comprising: a tubular body having a forward end and a rearward end;
   an invisible light beam emitting diode having an emitting lens;
   mounting means inside of said tubular body mounting the diode at a location within the body, between the two ends of the body, with the lens of the diode directed towards the forward end of the body;
   control circuit means for the diode adapted to be repetitiously charged and discharged, and on each discharge causing the diode to light and transmit a narrow beam of invisible light through the emitting lens towards the forward end of the tubular body said control circuit means functioning to turn the diode on and off at a rate resulting in the diode being on between about 10–20% of the time and off during the remainder of the time, and when on being powered by a current that is substantially larger than the diode could stand if on continuously; and
   projection lens means within the tubular body, forwardly of the diode, of a type which is always in focus in a range between a predetermined minimum distance from the light projector and infinity, said projection lens means being positioned and adapted to receive the narrow beam of invisible light from the diode lens and enlarge and collimate this light into a collimated beam of invisible light in sharp focus, to produce a lighting spot having a sharp and definite edge.

2. An invisible light projector according to claim 1, comprising a tubular carrier within said tubular body, said mounting means being in the form of an end wall at an end of the tubular carrier.

3. An invisible light projector according to claim 2, wherein said control circuit means is housed within the tubular carrier.

4. An invisible light projector according to claim 3, wherein said control circuit means comprises a circuit board which extends diametrically within the tubular carrier.

5. An invisible light projector according to claim 1, wherein said circuit means is located within said tubular body between the rearward end of the body and the mounting means for the diode, control switch means for turning the control circuit means on and off, located outside of said tubular body, and conductor means connecting the control switch to the control circuit means.

6. An invisible light projector according to claim 5, wherein the tubular body includes an end wall at the rearward end of the tubular body, and said conductor means comprises a two component connector, one of said components being mounted on the end wall.

7. An invisible light projector according to claim 1, wherein said control circuit means comprises battery means located within said tubular body between the rearward end of the body and the mounting means for the diode.

8. An invisible light projector according to claim 7, wherein said control circuit means also comprises a circuit board which extends diametrically within the tubular body, and wherein the battery means is positioned radially outwardly from the circuit board.

9. An invisible light projector according to claim 1, comprising a tubular carrier within said tubular body, and wherein said control circuit means is housed within the tubular carrier and the control circuit means includes battery means.

10. An invisible light projector according to claim 9, wherein said control circuit means comprises a circuit board which extends diametrically within the tubular carrier and the battery means is positioned radially outwardly of the circuit board.

11. An invisible light projector according to claim 1, wherein the projection lens means comprises a periscopic lens mounted within the tubular body towards the forward end of the tubular body, and a meniscus lens mounted within the tubular body substantially immediately rearwardly of the periscopic lens, said meniscus lens being smaller in diameter than said periscopic lens.

12. An invisible light projector according to claim 11, wherein the lens on the LED is a simple meniscus lens.

13. An invisible light projector according to claim 12, comprising a tubular carrier within said tubular body, adjacent the rearward end of the tubular body, said mounting means being in the form of an end wall at the inner end of the tubular carrier, and wherein the control circuit means is housed within the tubular carrier, between said mounting means and the rearward end of the tubular body.

14. An invisible light projector according to claim 1, wherein the control circuit means comprises battery means for producing a current, transistor means between the battery means and the diode, and integrated circuit means including a capacitor for triggering the transistor means, so that the transistor means functions as a switch to ultimately transmit and interrupt current flow from the battery means to the diode.

15. An invisible light projector according to claim 1, wherein the diode is an infrared LED.

16. An invisible light projector according to claim 1, wherein the diode is a laser diode.

17. A night vision system, comprising:
an invisible light beam projector comprising:
a tubular body having a forward end and a rearward end;
an invisible light beam emitting diode having an emitting lens;
mounting means inside of said tubular body mounting the diode at a location within the body, between the two ends of the body, with the lens of the diode directed towards the forward end of the body;
control circuit means for the diode adapted to be repetitiously charged and discharged, and on each discharge causing the diode to light and transmit a narrow beam of invisible light through the emitting lens towards the forward end of the tubular body said control circuit means functioning to turn the diode on and off at a rate resulting in the diode being on between about 10-20% of the time and off during the remainder of the time, and when on being powered by a current that is substantially larger than the diode could stand if on continuously; and
projection lens means within the tubular body, forwardly of the diode, of a type which is always in focus in a range between a predetermined minimum distance from the light projector and infinity, said projection lens means being positioned to receive the narrow beam of invisible light from the diode lens and collimate and focus this light into a collimated, sharp focused beam of invisible light, to produce a lighting spot having a sharp and definite edge; and
a night vision telescope positioned adjacent to said invisible light projector and comprising an objective lens, and an image intensifier means positioned to receive an optical image from the objective lens, said telescope having a line of sight that is substantially parallel to the beam of invisible light.

18. A night vision system according to claim 17, comprising a tubular carrier within said tubular body, said mounting means being in the form of an end wall at an end of the tubular carrier.

19. A night vision system according to claim 18, wherein said control circuit means is housed within the tubular carrier.

20. A night vision system according to claim 19, wherein said control circuit means comprises a circuit board which extends diametrically within the tubular carrier.

21. A night vision system according to claim 17, wherein said circuit means is located within said tubular body between the rearward end of the body and the mounting means for the diode, control switch means for turning the control circuit means on and off, located outside of said tubular body, and conductor means connecting the control switch to the control circuit means.

22. A night vision system according to claim 21, wherein the tubular body includes an end wall at the rearward end of the tubular body, and said conductor means comprises a two component connector, one of said components being mounted on the end wall.

23. A night vision system according to claim 17, wherein said control circuit means comprises battery means located within said tubular body between the rearward end of the body and the mounting means for the diode.

24. A night vision system according to claim 23, wherein said control circuit means also comprises a circuit board which extends diametrically within the tubular body, and wherein the battery means is positioned radially outwardly from the circuit board.

25. A night vision system according to claim 17, comprising a tubular carrier within said tubular body, and wherein said control circuit means is housed within the tubular carrier and the control circuit means includes battery means.

26. A night vision system according to claim 25, wherein said control circuit means comprises a circuit board which extends diametrically within the tubular carrier and the battery means is positioned radially outwardly of the circuit board.

27. A night vision system according to claim 17, wherein the projection lens means comprises a periscopic lens mounted within the tubular body towards the forward end of the tubular body, and a meniscus lens mounted within the tubular body substantially immediately rearwardly of the periscopic lens.

28. A night vision system according to claim 27, wherein the lens on the LED is a simple meniscus lens.

29. A night vision system according to claim 28, comprising a tubular carrier within said tubular body, adjacent the rearward end of the tubular body, said mounting means being in the form of an end wall at the inner end of the tubular carrier, and wherein the control circuit means is housed within the tubular carrier, between said mounting means and the rearward end of the tubular body.

30. A night vision system according to claim 17, wherein the control circuit means comprises battery means for producing a current, transistor means between the battery means and the diode, and integrated circuit means including a capacitor for triggering the transistor means, so that the transistor means functions as a switch to ultimately transmit and interrupt current flow from the battery means to the diode.

31. A night vision system according to claim 17, wherein the diode is an infrared LED.

32. A night vision system according to claim 17, wherein the diode is a laser diode.

33. An invisible light beam projector, comprising:
a tubular body having a forward end, a rearward end and a center axis;
a single invisible light beam emitting diode having an emitting lens;
mounting means inside of said tubular body mounting the diode at a location within the body, between the two ends of the body, with the lens of the diode on said center axis, directed towards the forward end of the body;
control circuit means for the diode adapted to be repetitiously charged and discharged, and on each discharge causing the diode to light and transmit a narrow beam of invisible light through the emitting lens towards the forward end of the tubular body said control circuit means functioning to turn the diode on less than it is off, and when on being powered by a current that is substantially larger than the diode could stand if on continuously; and
projection lens means within the tubular body, forwardly of the diode, of a type which is always in focus in a range between a predetermined minimum distance from the light projector and infinity, said projection lens means being positioned and adapted to receive the narrow beam of invisible light from the diode lens and enlarge and collimate this light into a collimated beam of invisible light in sharp focus, to produce a lighting spot having a sharp and definite edge.

34. A night vision system, comprising:
an invisible light beam projector comprising:
a tubular body having a forward end, a rearward end and a center axis;
a single invisible light beam emitting diode having an emitting lens;
mounting means inside of said tubular body mounting the diode at a location within the body, between the two ends of the body, with the lens of the diode on said center axis directed towards the forward end of the body;
control circuit means for the diode adapted to be repetitiously charged and discharged, and on each discharge causing the diode to light and transmit a narrow beam of invisible light through the emitting lens towards the forward end of the tubular body said control circuit means functioning to turn the diode on less than it is off, and when on being powered by a current that is substantially larger than the diode could stand if on continuously; and
projection lens means within the tubular body, forwardly of the diode, of a type which is always in focus in a range between a predetermined minimum distance from the light projector and infinity, said projection lens means being positioned to receive the narrow beam of invisible light from the diode lens and collimate and focus this light into a collimated, sharp focused beam of invisible light, to produce a lighting spot having a sharp and definite edge; and
a night vision telescope positioned adjacent to said invisible light projector and comprising an objective lens, and an image intensifier means positioned to receive an optical image from the objective lens, said telescope having a line of sight that is substantially parallel to the beam of invisible light.

* * * * *